(No Model.) 5 Sheets—Sheet 2.
W. J. SLEFFEL.
NUT TAPPING MACHINE.
No. 534,015. Patented Feb. 12, 1895.

(No Model.) 5 Sheets—Sheet 3.

W. J. SLEFFEL.
NUT TAPPING MACHINE.

No. 534,015. Patented Feb. 12, 1895.

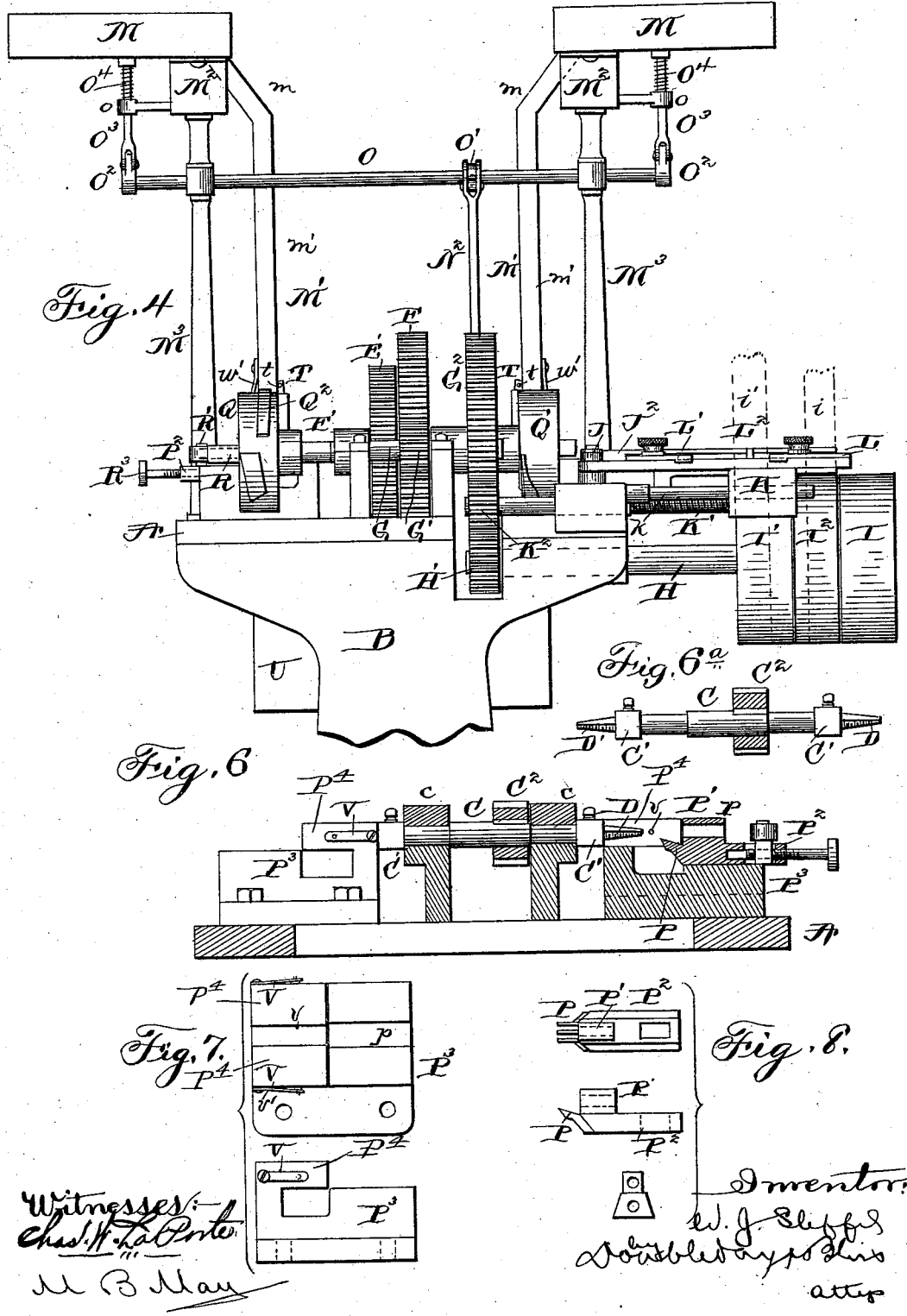

(No Model.)　　　　　W. J. SLEFFEL.　　　5 Sheets—Sheet 5.
NUT TAPPING MACHINE.
No. 534,015.　　　　　　　　Patented Feb. 12, 1895.
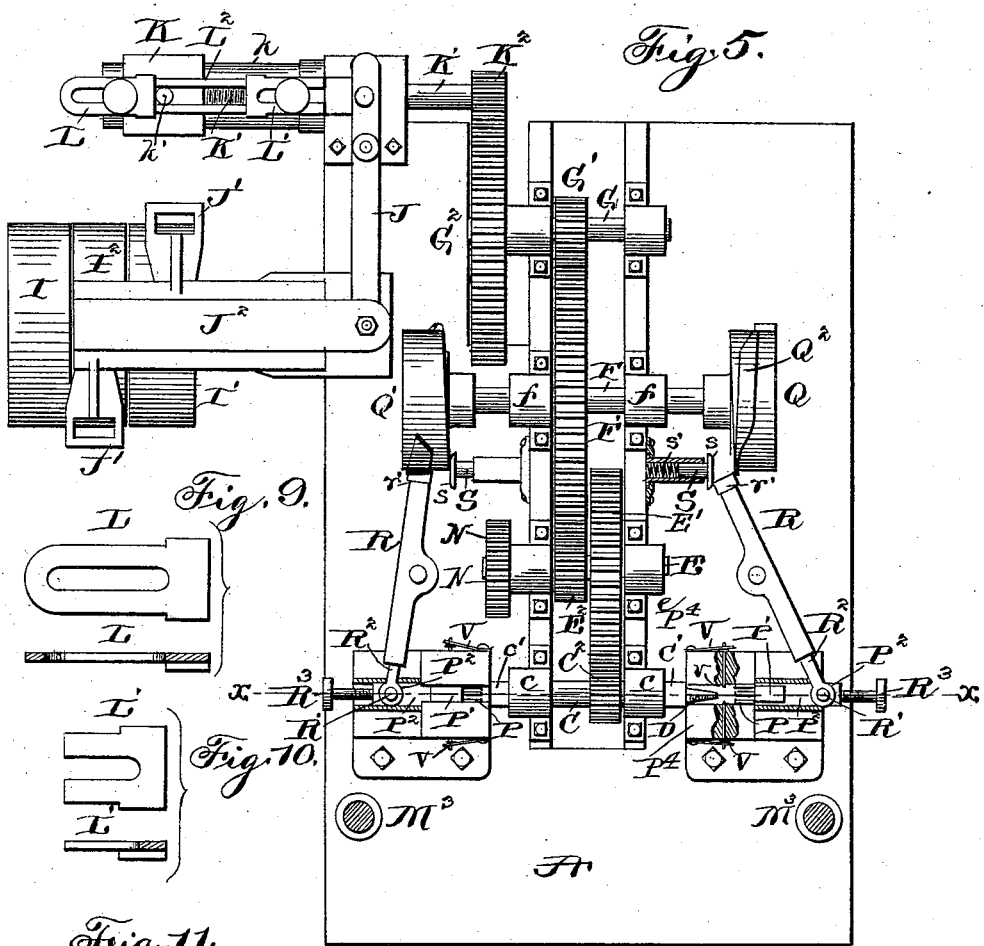
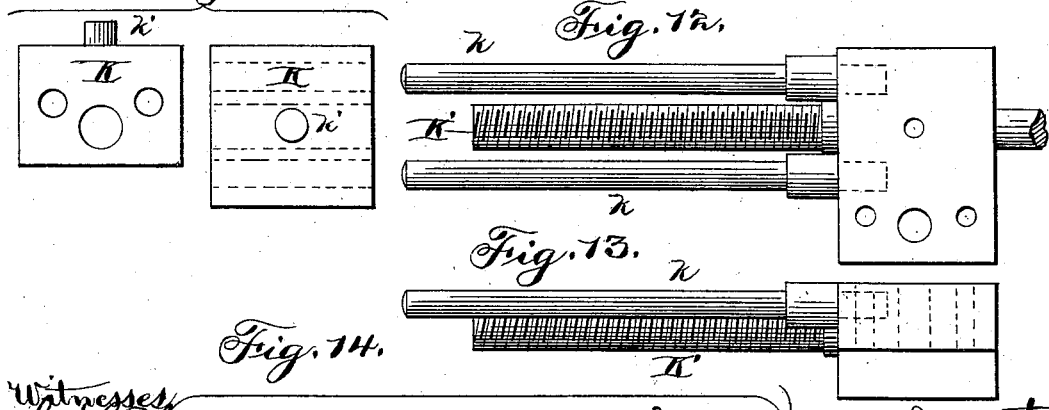

UNITED STATES PATENT OFFICE.

WILLIAM JAMES SLEFFEL, OF COLUMBUS, OHIO.

NUT-TAPPING MACHINE.

SPECIFICATION forming part of Letters Patent No. 534,015, dated February 12, 1895.

Application filed January 8, 1894. Serial No. 496,166. (No model.)

*To all whom it may concern:*

Be it known that I, WILLIAM JAMES SLEFFEL, a citizen of the United States, residing at Columbus, in the county of Franklin and State of Ohio, have invented certain new and useful Improvements in Nut-Tapping Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
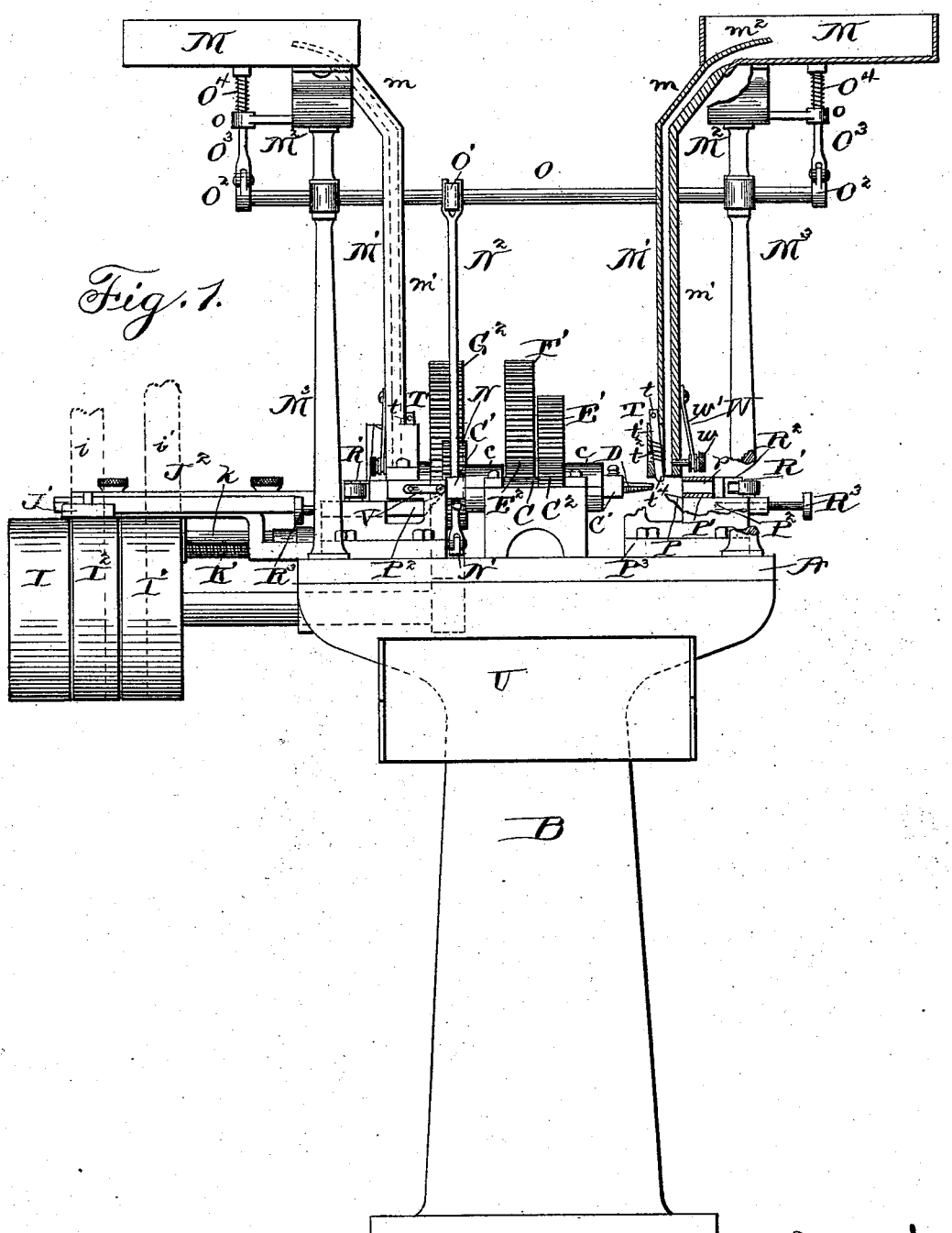
Figure 2:
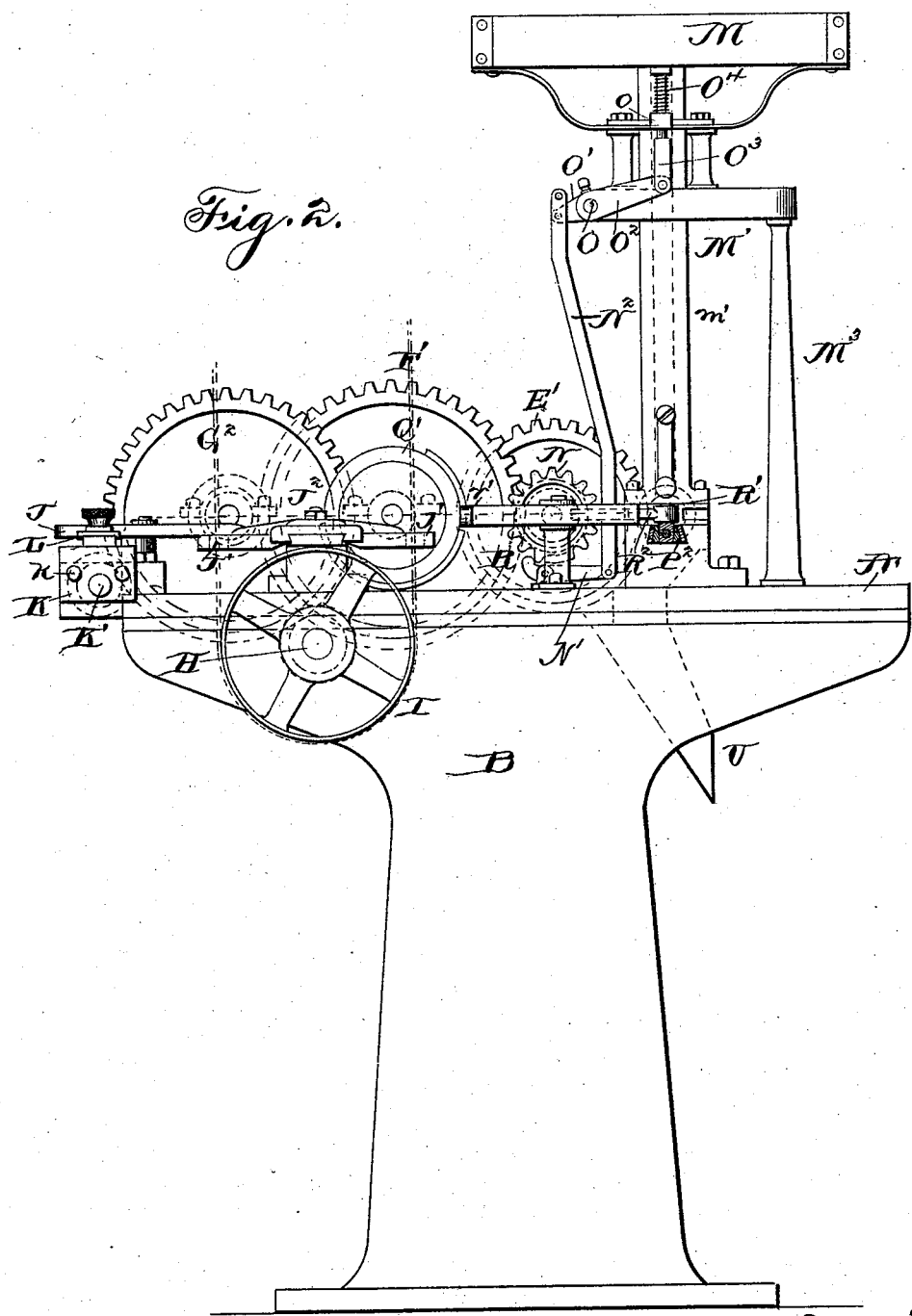
Figure 3:
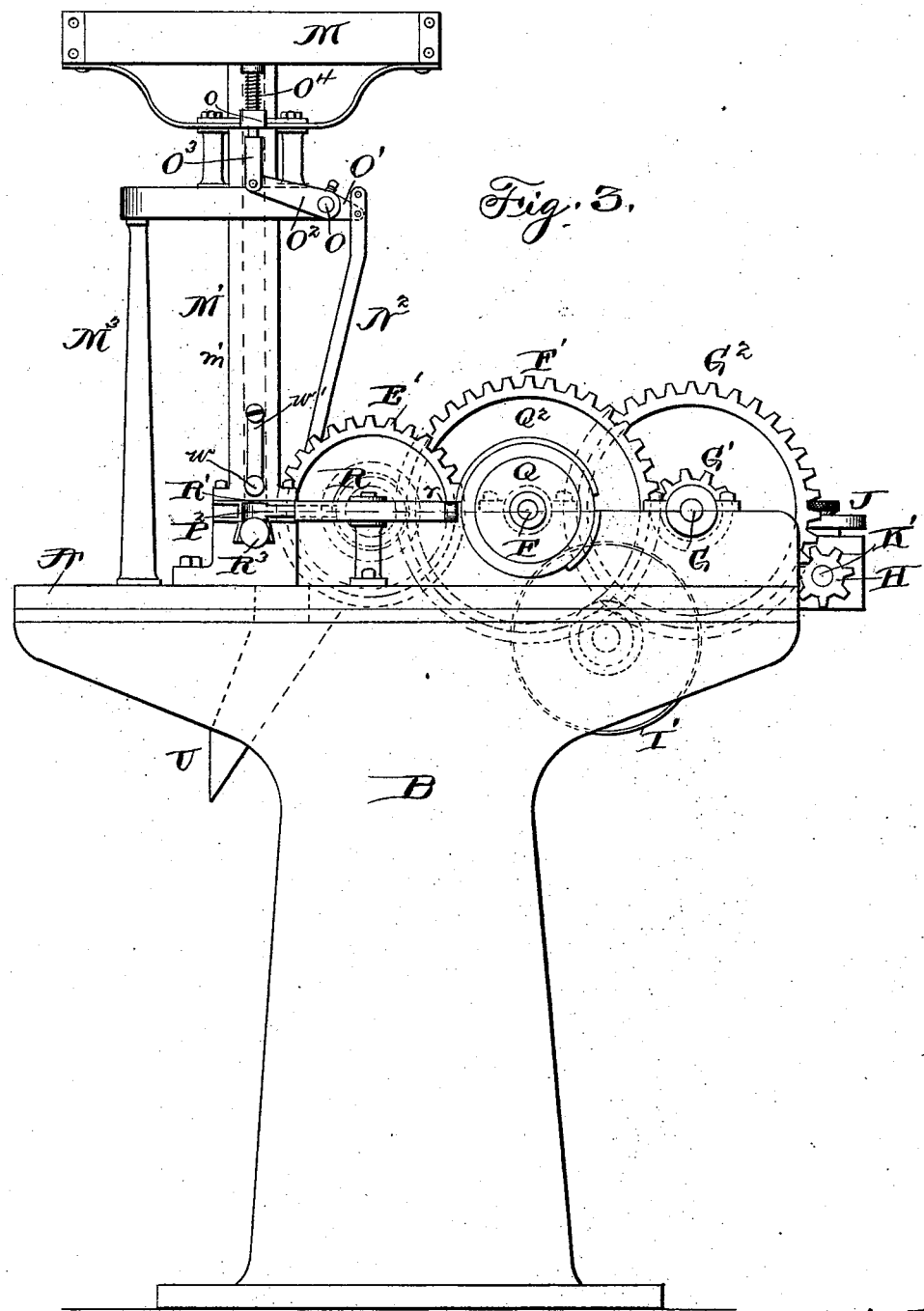

Figure 1 is a front elevation. Fig. 2 is a side elevation. Fig. 3 is an elevation from the opposite side. Fig. 4 is a rear elevation. Fig. 5 is a plan view with some of the parts removed. Fig. 6 is a section on the line $x$—$x$ Fig. 5. Figs. $6^a$ and 7 to 14 show details.

As shown, the operative parts of the machine are supported upon a plate or bed A which rests upon one or more standards or uprights B.

I will first describe what may be regarded as the more important or essential parts.

C represents a mandrel or shaft having the central or journal part mounted in boxes or bearings at $c$. Outside of the boxes it has chucks or socket pieces C' C'. Into these taps D D' can be inserted, adapted to cut a thread of any of the ordinary characters. Only one of these taps is shown in Figs. 1 and 6, the opposite tap D' being hidden in the abutment piece P'. The taps project in opposite directions and operate alternately. A nut blank is first delivered to tap D and is properly held while the tap is passed through it. Then, by any suitable mechanism, the mandrel C is reversed and immediately thereafter a nut blank is fed to the other tap D' and is advanced inward, the nut just previously threaded by tap D being now pushed off by the reverse motion of the mandrel.

I have shown the mechanism, which I at present prefer, for delivering the nut blanks successively in two series to the taps, also a means for advancing them on the taps longitudinally, and also a mechanism for actuating the feeding devices and the mandrel and for reversing the latter. The mandrel C has a gear wheel $C^2$ between the boxes $c$. With this there engages a gear wheel E' on a shaft E mounted in boxes at $e$, shaft E carrying also a pinion $E^2$. The latter receives motion from a gear wheel F' on shaft F mounted in bearings at $f$. G is a shaft having a pinion G' which engages with said gear wheel F' and receiving power through a gear wheel $G^2$. The wheel is driven by a pinion H' on the reversible power shaft H. This shaft is provided with two loose pulleys I, I', and a fixed pulley $I^2$.

Two oppositely moving belts $i$, $i'$ are connected when the machine is not in operation with the loose pulleys I, I' but they are adapted to be alternately shifted to the fixed pulley $I^2$ by means of the shifting device which comprises the belt guides J', J', the sliding arm $J^2$ and the vibrating lever J actuated as follows:

K is a nut supported upon guide rods $k$, and engaging with a threaded shaft K'. This shaft carries a gear wheel $K^2$ meshing with the aforesaid wheel $G^2$. When the power shaft H is rotating, the gear wheel $G^2$ will cause a rotation of the shaft K', which will result in a longitudinal movement of the nut K. This nut is provided with a pin or arm $k'$ which can impinge upon plates L, L', adjustably secured to a carrier $L^2$ which is pivoted to the aforesaid lever J.

When the shaft K' is rotating as above described, the nut K continues to move until it strikes one of the plates L, L'. When it strikes the plate L it pushes it outward and draws outward the short arm of lever J, and this results in a shifting of the belts $i$ $i'$ bringing that at $i$ upon the fixed pulley $I^2$, and that at $i'$ upon the loose pulley I'. Instantly the rotating parts are reversed including the screw shaft K' which results in the movement of the nut K in the opposite direction, such motion continuing until it impinges on plate L' and as soon as it strikes the latter, the short arm of lever J is pushed inward and the belt $i$ is taken to the loose pulley I, while the belt $i'$ is taken to the fixed pulley $I^2$ whereupon the parts are all set in motion in the opposite direction.

The parts referred to include the mandrel C, which by the devices above described is rotated first to the right, and then to the left at regularly recurring intervals.

There are two sets of devices for delivering the nut blanks to the taps respectively, and they are throughout substantially duplicates.

M is a hopper into which the blanks can be placed in quantities from time to time. From this there is a chute or guide-way M' leading down to a tap, the chute having preferably the inclined part $m$ and the vertical part $m'$. At $m^2$ there is a plate or diaphragm extending a suitable distance above the floor of the hopper, and adapted to insure that the blanks shall pass singly toward the chute M'.

Slight jars or blows are imparted with sufficient force to the hoppers to cause the blanks to tend to move toward the guide-way M'. This can be done in the manner illustrated use being made of a cam wheel N on the shaft E. Its cams successively vibrate a lever N' which is pivoted to a pitman $N^2$, and the latter is in turn pivoted to a lever O' secured to a rock shaft O. This shaft has levers or crank arms $O^2$ to which are pivoted hammer bars $O^3$, each passing through a guide $o$ and having its end arranged to strike against the bottom of a hopper. The cam wheel N, at intervals draws down the hammer rod $O^3$ which is instantly thrown up again by a coiled spring $O^4$. The jars imparted to the hopper cause the nuts to pass therefrom in the way described. Preferably the hopper is mounted on a sheet metal carrier $M^2$ secured to a stand $M^3$ which also supports the aforesaid rock-shaft O.

The bottom nut of the series is supported on a rest P, in front of the tap. This rest consists preferably of one or more fingers or bars, which are secured to or formed with an abutment piece P' which bears against the back face of the nut blank and which has its upper surface flush with the bottom edge of the guide-way M' so as to serve as a cut-off.

The parts just described are attached to a slide $P^2$, a guide block $P^3$ holding them in proper line, the guide-way at $p$ being such as to permit the blank to move longitudinally but prevent it from rotating. The nut blanks are successively pushed toward the taps and by the slide $P^2$ which is reciprocated as follows:

Q Q' are cam wheels secured to the aforesaid shaft F, each being provided with a peripheral cam $Q^2$ adapted to intermittingly engage with a lever R. The latter is pivoted to a suitable part, and has one end adjacent to the cam wheel and the other adjacent to the slide $P^2$. It is connected to the slide by means of a pivot at R', there being preferably an extensible or sliding arm $R^2$ attached to the pivot and seated in a guideway in the end of the lever R. The position of the pivot can be properly adjusted by means of a screw at $R^3$ movable on lines parallel with the path of the slide. The end $r'$ of the lever R, at the proper times is engaged by the cam $Q^2$ on wheel Q and forced inward, which draws the slide $P^2$, this occurring immediately after the tap's action is completed.

At S there is a pushing device for moving the lever R in the opposite direction and in order to successfully attain certain ends I prefer that this should be of the nature of a yielding plate or arm $s$ bearing against a spring $s'$. Any suitable stop can be used to moderate the movement of the plate $s$, but in practice, I find that the face of the cam-wheel Q is advantageous. When the cam $Q^2$ pushes lever R inward, the end $r'$ of the latter bears directly against the plate $s$ and the latter yields until the end of the cam $Q^2$ is reached, whereupon the spring and the pusher S throw the lever to the outside of the cam $Q^2$ and the slide $P^2$ is moved in the opposite direction for the purpose of carrying a nut blank to the tap.

The two cams Q Q' are so related that when one of the levers I is being pushed inward, the other is being pushed outward.

In order to insure that the vertically moving nut blanks and particularly the last one of a series, shall be held properly on the rest P and vertically against the abutment P', I employ in conjunction with each guideway a peculiarly arranged retaining device T. As shown it consists of a pin $t$ held in a guide socket $t'$, and normally pressed outward by a spring $t^2$. Its lower end is preferably chamfered or beveled as at $t^4$. It extends down slightly below the bottom of the guide passage M' and therefore acts to prevent the upper edge of a nut blank from swinging outward, and compels it to rest squarely against the abutment P'. When the blank is being pushed inward by the slide $P^2$, its upper edge impinges on the beveled part $t^4$ on the retainer T and the latter yields upward far enough to permit the blank to move on under it; and the retainer is held upward by the blank and by the abutment P' until the threaded blank has dropped and the abutment has moved back behind the end of pin $t^4$, whereupon the latter snaps down and prevents the next dropping blank from falling inward.

V V represent two supplemental spring-held retainers preferably arranged horizontally on a line somewhat inside of the retainer T, they being shown as mounted in apertures in the guide blocks $P^3$. They may consist of pins with beveled ends $v$, and have combined with them flat springs $v'$ bearing against their outer ends to normally hold them in at certain points. These act to catch the blank after it escapes from the retainer T and prevent it from falling inward. They are particularly advantageous when the last blank of a series is being advanced, as that blank will have a tendency to fall forward, it lacking the superincumbent blanks to hold it true vertically. The beveled ends at $v$ provide for the pins to be pushed outward when the pressure is exerted against them. After the thread has been formed in the blank, and as soon as the mandrel or tap is reversed, the blank or nut is caused to unscrew from the tap by means of the projections P⁴, on the block P³, which prevent it from rotating and cause it to move longitudinally till it is withdrawn therefrom. When the finished nut drops from the tap it falls into a receiving chute U which guides it into a box or receptacle (not shown) adapted to hold any desired quantity of the articles and to be withdrawn from time to time and emptied.

The operation of the above described machine will be readily understood. Power is applied to the belts $i$, $i'$, and if the belt $i$ be in engagement with the fixed pulley I², the gearing and shafting, from the shaft H to the mandrel C will be so actuated as to rotate the mandrel in the direction which causes the cap D to be operative. Just as soon as it begins to so rotate, the slide P² is pushed in by the lever R and the cam wheel Q. As the slide moves it engages with the bottom nut blank of the vertical series in the chute $m$ and pushes it toward the tap, and the cutters at once commence to act to form a thread in the blank, the retainers T and V yielding to permit its passage from under the guide. The slide P continues to carry inward the blank until it reaches the inner end of the tap, and then it stops, the cam on the wheel Q being so related to the other parts that its end passes the lever R, and the said end is no longer pushed inward. At about the same instant that this occurs, the belts $i$ $i'$ are shifted, $i$ going to a loose pulley and $i'$ to the fixed pulley I² which results in a quick reversal of the shafting and mandrel C, and the cam wheel W'. The reversal of mandrel C tends to push the nut blank just finished outward from the tap D and also rotates tap D' in the opposite direction; and the cam wheel Q' causes the second slide P² to push a nut blank toward this tap D', in the way already described, the opposite slide P² being held in its outermost position. At the time the threading of the blank is completed the belts are again shifted and the parts are again reversed. As the taps point in opposite directions, the reversal of the shaft makes them alternately active and inactive and blanks can be very rapidly treated by the taps alternately.

Although I have shown only two taps in connection with the driving parts of the machine, it can be readily understood that there can be variations in this respect without materially affecting the principal features of the invention.

When it is desired from any cause to stop the travel of the blanks through the chute $m$, irrespective of the movements of the machine, it can be readily done by means of the cut-off devices at W. As shown these consist of a pin $w$ passing through the wall of the chute $m$, and adapted to traverse the path of the blanks. $w'$ is a spring engaging with it, and tending to push it in; but the pin can be held out by turning part way around. Under some circumstances a mere set-screw or thumb screw can be used, it being adapted to be thrust into or withdrawn from the path of the blanks.

What I claim is—

1. The combination with the longitudinally stationary mandrel, the two taps secured thereto, and the feed slides reciprocating in the longitudinal lines of the taps, of the reversible power shaft, the gearing connecting the power shaft with the mandrel, and power devices connecting the said power shaft with the said feed slides for reciprocating them, substantially as set forth.

2. The combination of the longitudinally stationary mandrel, the two taps secured thereto and projecting in opposite directions, the reversible driving shaft, the gearing connecting said shaft with the said mandrel, the alternately acting feed slides, and the pivoted levers positively connecting the feed slides with the power shaft for reciprocating the said slides in the longitudinal lines of the mandrel, substantially as set forth.

3. The combination with the mandrel, of the reversible driving shaft, one or more driving belts therefor, the threaded shaft supplemental to the reversible driving shaft, gearing connecting said shafts, the longitudinally moving nut on said threaded shaft, and the shifting device for the belts actuated by said nut, substantially as set forth.

4. The combination with the tap mandrel, of the reversible driving shaft having the two loose pulleys and the fixed pulley, of the shifting device for the belt, the pivoted lever J, the nut adapted to push said lever alternately in opposite directions, and the reversible threaded shaft supplemental to and parallel with the driving shaft, substantially as set forth.

5. The combination with the reversible driving shaft, the fast pulley and the loose pulleys thereon, and the shifting devices for the belts, of the supplemental threaded shaft parallel to the said driving shaft and actuated thereby, the guide rods lying in proximity to said threaded shaft, the nut mounted on said threaded shaft and engaging said guide rods and the pivoted lever engaging with the belt shifting devices and adapted to be moved by said nut in opposite directions, substantially as set forth.

6. The combination with the tap mandrel, the shafting for rotating the mandrel, the cam wheel Q, the feeding slide, the lever actuated by said cam wheel for moving the slide, and the spring pusher, disconnected from and intermittingly engaging said lever, substantially as described.

7. The combination with the longitudinally stationary mandrel, of the reversibly rotatable cam wheel Q, and the feed slide actuated thereby, and reciprocating in the longitudinal lines of the mandrel, substantially as set forth.

8. The combination with the longitudinally stationary tap, the pinion rigidly mounted thereon for driving it, and the feed slide, of the pivoted lever engaging said feed slide, and a reversibly rotatable cam wheel for actuating the pivoted lever, substantially as set forth.

9. The combination with the longitudinally stationary mandrel, and the feed slide, reciprocating in the longitudinal lines of the mandrel, of the reversibly rotatable cam wheel having a peripheral cam extending part way around said cam wheel, and having an operative edge on each side for reciprocating the said feed slide, substantially as set forth.

10. The combination with the tap, and the feed slide, of the reversibly rotatable cam wheel having a substantially spiral peripheral cam extending around said cam wheel, and a lever for actuating said feed slide and adapted to be engaged by both the side faces of the said cam, substantially as set forth.

11. The combination with the tap, and the feed slide, of the lever connected to said feed slide, the cam wheel having a peripheral double faced cam extending around said wheel, and having either face alternately engaging with said lever, and a spring pusher for holding said lever against one of the faces of the cam, substantially as set forth.

12. The combination with the horizontally arranged tapping devices, of the blank feeder having the hopper, the reduced guide-way extending from the hopper, the slide for carrying the blanks from the guide-way to the tap, the means for withdrawing the blank back from the tap, and the yielding retainer T between the guide and the tap, substantially as set forth.

13. The combination with the horizontally arranged longitudinally stationary tap, mounted in stationary bearings against lateral movement, devices for reversibly rotating said tap, the hopper, and the vertical guide-way, of the feed slide beneath said guide-way and reciprocating in the longitudinal lines of the tap for receiving the blank, directly from the guide-way and bearing it against said horizontally arranged tap, and means for withdrawing the blank from the tap when the said slide is withdrawn, substantially as set forth.

14. The combination with the tapping device, the stationary immovable chute or guideway, the spring supported movable hopper, the power devices, the striking or agitating mechanism driven by the power devices and engaging the hopper for causing the advance of the blanks from the hopper to the guideway, and means for regulating the passage of the blanks through the guideway, substantially as set forth.

15. The combination with the tapping devices, and the stationary guide-way, having the deflecting plate $m^2$, of the hopper, the spring supporting said hopper, and the devices for agitating or reciprocating said hopper and causing the advance of the blanks from the hopper to the guide-way, substantially as set forth.

16. The combination with the longitudinally stationary horizontally arranged reversible tap, mounted in laterally stationary bearings, and the chute or guide-way, of the feed slide adapted to receive the blanks from the chute and carry them to the tap, said feed slide having a rest for the blank and means supplemental to the tap for removing the blanks from the rest, while the slide is being withdrawn, substantially as set forth.

17. The combination with the reversible tap spindle, the stationary non-movable bearings in which said spindle is mounted, and the vertically arranged chute or guide-way, of the feed slide for advancing the nuts from the guide to the tap, and the means for withdrawing the nut from the tap when the slide is withdrawn, substantially as set forth.

18. The combination with the tapping device, of the hopper, the guide-way extending therefrom, the means for advancing the blanks from the guide-way toward the tap and the yielding holders $v$ between the guide-way and the inner end of the tap, substantially as set forth.

In testimony whereof I affix my signature in presence of two witnesses.

WILLIAM JAMES SLEFFEL.

Witnesses:
CHRISTIAN LEHMAN,
CHARLES C. SLEFFEL.